United States Patent
Takemura

(10) Patent No.: US 9,672,386 B2
(45) Date of Patent: Jun. 6, 2017

(54) DIGITAL MULTI-FUNCTION PERIPHERAL AND DATA PROTECTION METHOD OF EXTERNAL MEMORY

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Minoru Takemura, Sagamihara (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 14/294,509

(22) Filed: Jun. 3, 2014

(65) Prior Publication Data
US 2015/0347767 A1    Dec. 3, 2015

(51) Int. Cl.
*G06F 21/79* (2013.01)
*G06F 21/62* (2013.01)

(52) U.S. Cl.
CPC .......... *G06F 21/79* (2013.01); *G06F 21/6245* (2013.01); *G06F 2221/2143* (2013.01)

(58) Field of Classification Search
CPC ......... G06F 21/62; G06F 21/79; G06F 21/602
See application file for complete search history.

(56) References Cited

U.S. PATENT DOCUMENTS

| | | | | |
|---|---|---|---|---|
| 5,960,085 A * | 9/1999 | de la Huerga | ........ | A61J 1/1437 235/380 |
| 7,496,765 B2 * | 2/2009 | Sengoku | .................. | G06F 21/78 713/189 |
| 8,011,011 B2 * | 8/2011 | Sakaguchi | .............. | G06F 21/10 707/802 |
| 8,972,744 B1 * | 3/2015 | Trimberger | ......... | G06F 12/1408 713/189 |
| 9,111,621 B2 * | 8/2015 | Krutzik | ................... | G06F 21/80 |
| 2002/0069316 A1 * | 6/2002 | Mattison | ................... | G06F 8/65 711/103 |
| 2006/0018484 A1 * | 1/2006 | Yoshihiro | ............... | G06F 21/34 380/277 |
| 2010/0011180 A1 * | 1/2010 | Yashima | ................ | G06F 21/79 711/162 |

(Continued)

FOREIGN PATENT DOCUMENTS

JP    2013-077942    4/2013

*Primary Examiner* — Harunur Rashid
*Assistant Examiner* — Cheng-Feng Huang
(74) *Attorney, Agent, or Firm* — Amin, Turocy & Watson LLP

(57) ABSTRACT

In accordance with one embodiment, a digital multi-function peripheral comprises an interface, a data storage section, a memory and a processor. The interface connects an external memory device. The processor holds the authentication information of a user who connects the external memory device, generates a hash value from the information containing the authentication information of the user who connects the external memory device in a case where the state of connection of the external memory device with the interface meets a data saving condition, stores the data obtained by encrypting the data in the external memory device using the generated hash value in the data storage section, and erases the data in the external memory device.

6 Claims, 4 Drawing Sheets

(56) References Cited

U.S. PATENT DOCUMENTS

| | | | |
|---|---|---|---|
| 2011/0113235 A1* | 5/2011 | Erickson | G06F 21/34 713/152 |
| 2011/0119495 A1* | 5/2011 | Daoud | G06F 21/79 713/183 |
| 2013/0145447 A1* | 6/2013 | Maron | G06F 21/31 726/6 |
| 2014/0071608 A1* | 3/2014 | Masaoka | G06F 1/1656 361/679.26 |

* cited by examiner

DIGITAL MULTI-FUNCTION PERIPHERAL AND DATA PROTECTION METHOD OF EXTERNAL MEMORY

FIELD

Embodiments described herein relate to a digital multi-function peripheral and a data protection method of an external memory.

BACKGROUND

In digital multi-function peripherals, there is a digital multi-function peripheral which has a function of storing data in a portable external memory connected by a user and carrying out image processing using the data of the external memory. Such a function is realized on condition that the user removes the external memory after the use. However, there exists a case where the user forgets to remove the external memory from the digital multi-function peripheral and leaves the external memory attached to the digital multi-function peripheral as it is, which may lead to a problem that the external memory is taken away by a third person, or that the data in the external memory is viewed by a third person.

DETAILED DESCRIPTION

In accordance with one embodiment, a digital multi-function peripheral comprises an interface, a data storage section, a memory and a processor. The interface connects an external memory device. The processor holds the authentication information of a user who connects the external memory device, generates a hash value from the information containing the authentication information of the user who connects the external memory device in a case where the state of connection of the external memory device with the interface meets a data saving condition, stores the data obtained by encrypting the data in the external memory device using the generated hash value in the data storage section, and erases the data in the external memory device.

The embodiment is described below with reference to the accompanying drawings.

Figure 1:
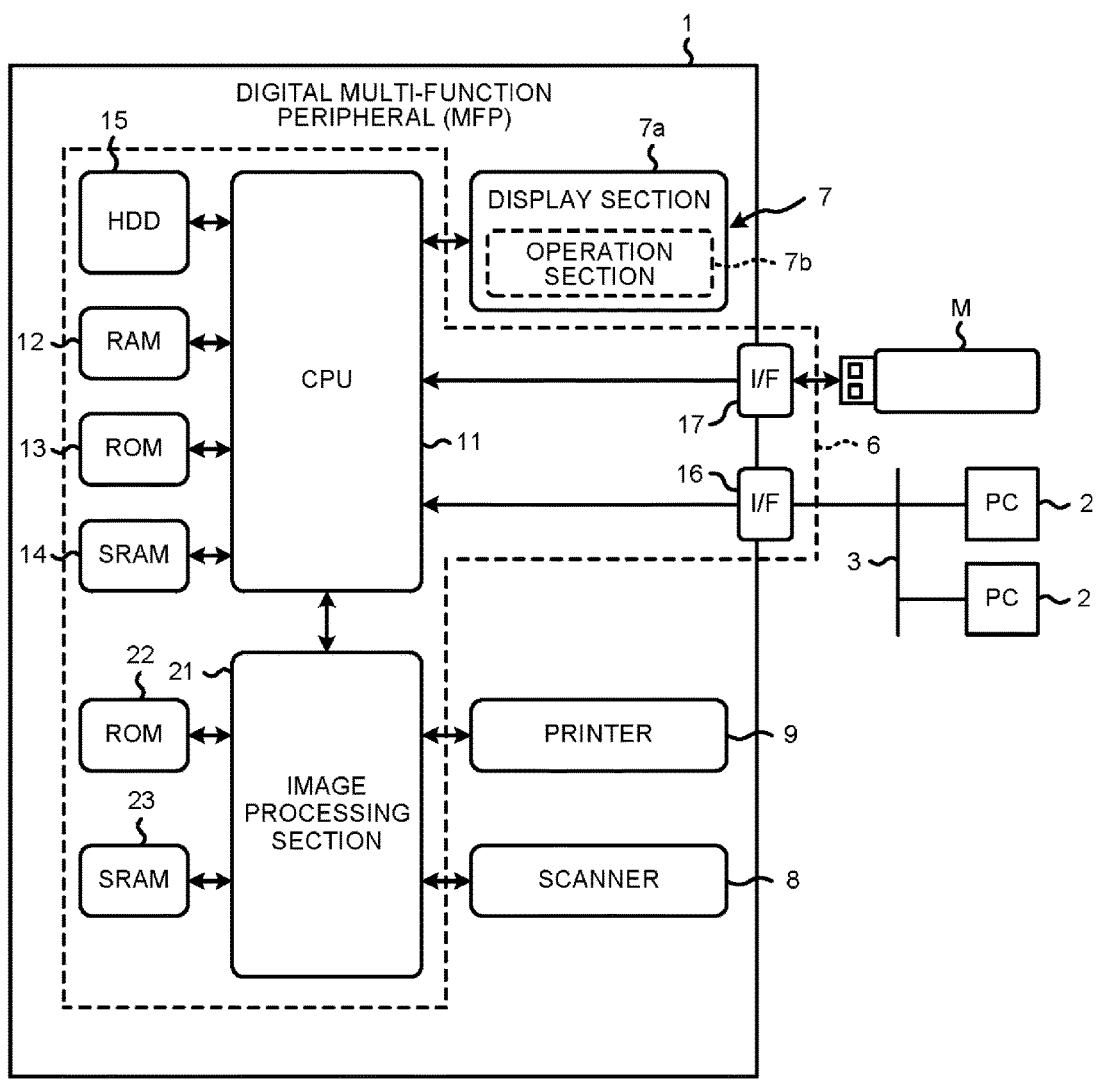
FIG. 1 is a block diagram illustrating an example of the constitution of a digital multi-function peripheral according to one embodiment.

FIG. 1 is a block diagram illustrating an example of the constitution of a digital multi-function peripheral (MFP) 1 according to the embodiment.

In the example of the constitution shown in FIG. 1, a digital multi-function peripheral 1 comprises a system control section 6, an operation panel 7, a scanner (image reading section) 8, a printer (image forming section) 9 and the like. The digital multi-function peripheral 1 functions as a copier, a scanner, a printer, or a network communication machine.

The scanner 8 reads an image on a document surface as color image data or monochrome image data. The scanner 8 optically scans the document surface to read the image on the document surface. The scanner 8 is provided with a scanning mechanism, a photoelectric conversion section, an auto document feeder (ADF) and the like.

The printer 9 forms a color image or a monochrome image on paper. For example, the printer 9 is an electrophotographic type image forming device. However, the printer 9 is not limited to the electrophotographic type, and it may be an inkjet type printer or a thermal transfer type printer which carry out image forming processing.

The operation panel 7 is a user interface. The operation panel 7 includes a display section 7a and an operation section 7b. The display section 7a and the operation section 7b are composed of a liquid crystal display device provided with a touch panel. The liquid crystal display device serving as the display section 7a displays guidance and the like to a user. The touch panel serving as the operation section 7b detects an operation instruction of a user on a touch key and the like displayed by the display section 7a.

The system control section 6 uniformly controls each section of the MFP 1. For example, the system control section 6 controls the scanner 8 and the printer 9 to realize a copy operation. The system control section 6 comprises a processor 11, a random access memory (RAM) 12, a read only memory (ROM) 13, a static random access memory (SRAM) 14, a hard disk drive (HDD) 15, a network interface 16, a memory interface 17 and the like.

The processor 11 is, for example, a CPU. The processor 11 executes the programs (commands) stored in the SRAM 14 or the HDD 15 to realize various processing functions. The processor 11 further includes a timer. The RAM 12 is a main memory functioning as a working memory. The ROM 13 stores, for example, a control program and control data in charge of the operations of the digital multi-function peripheral 1. The SRAM 14 is a memory for holding storage information through power such as a battery. The SRAM 14 is capable of inputting/outputting information at a high speed. The SRAM 14 functions as a cache memory or a program memory which stores programs and the like.

The HDD 15 is a non-volatile memory for storing data. The HDD 15 functions as a data storage section. The HDD 15 stores the image data to be processed or user management information and the like. Further, the HDD 15 functions as a memory for storing the programs executed by the processor. The interface 16 is a network interface for carrying out communication with a PC 2 or other MFPs through a network 3.

The interface 17 is an external memory interface for connecting an external memory (external memory device) M. A user attaches the external memory M to or detaches the external memory M from the interface 17 at any timing. The interface 17, for example, reads data from the external memory M or writes data to the external memory M. The interface 17 is of a constitution based on the standard of the external memory M it supports. For example, in a case where the external memory is a USB memory, the interface 17 is of a constitution based on an interface standard of the USB.

An image processing section 21 carries out an image processing. For example, the image processing section 21 carries out image processing on image data such as the image data read by the scanner 8, the image data received through the network, or the image data read from the external memory M. Further, the image processing section generates image data for printing and supplies the generated image data for printing for the printer 9. The image processing section 21 is provided with a processor and a LSI for image processing. For example, the processor of the image processing section 21 carries out image processing according to the program or control data stored in a ROM 22 or a SRAM 23.

Next, a data saving processing for saving the data of the external memory M by the digital multi-function peripheral 1 according to the present embodiment is described.

Figure 2:
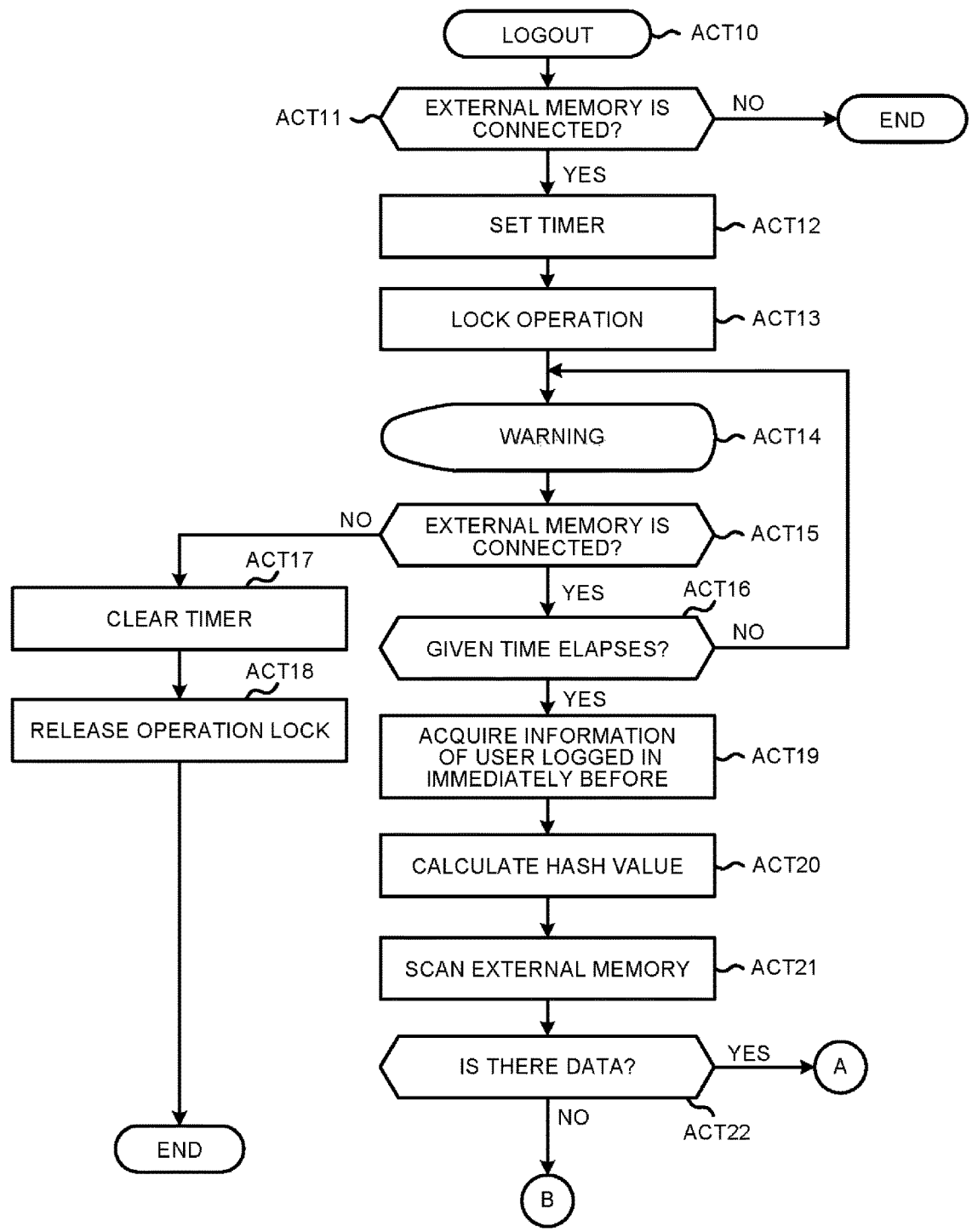
FIG. 2 is a flowchart illustrating an example of a data saving processing of an external memory carried out in the digital multi-function peripheral according to the embodiment.
Figure 3:
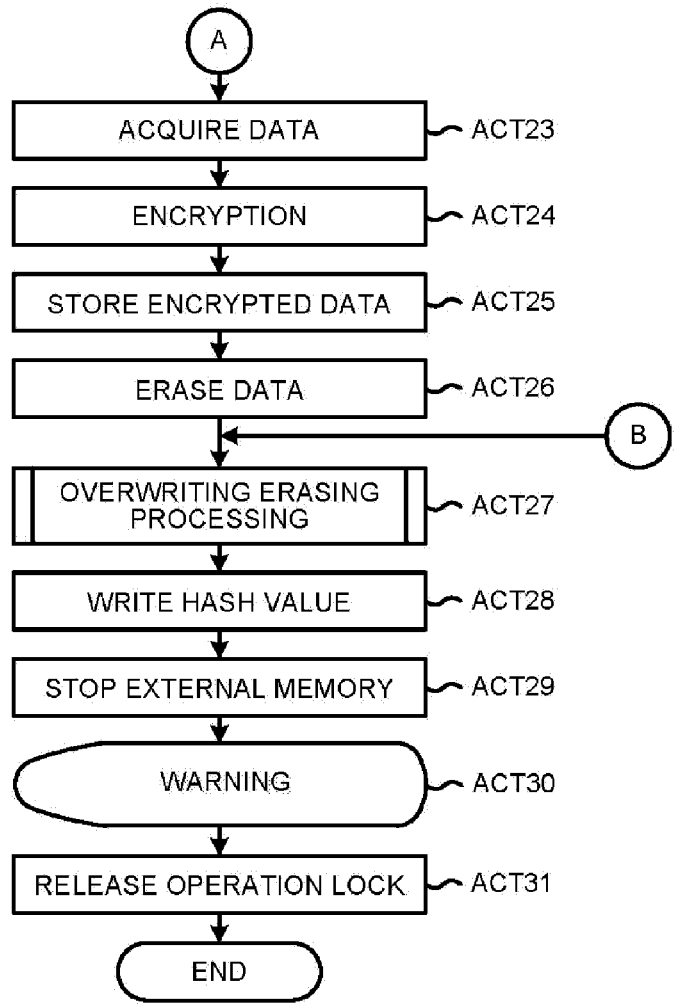
FIG. 3 is a flowchart illustrating an example of data saving processing of the external memory carried out in the digital multi-function peripheral according to the embodiment.

FIG. 2 and FIG. 3 are flowcharts illustrating the data saving processing carried out in the digital multi-function peripheral 1 according to the present embodiment.

It is assumed that the user logged in to the digital multi-function peripheral 1 is logged out. The processor 11 in the system control section 6 of the MFP 1 logs the user out in a case where the user instructs to log out, or in a case where a no-operation state lasts for a given time in the login state. In addition, the processor 11 at least holds the information of the user logged in immediately before in the SRAM 14 and the like. Herein, the information of the user logged in contains user ID and authentication information (for example, password) of the user.

When the user is logged out, the processor 11 determines whether or not the external memory M is connected with the interface 17 (ACT 11). If it is determined that the external memory M is not connected with the interface 17 (NO in ACT 11), the processor 11 ends the processing.

Further, if it is determined that the external memory M is connected with the interface 17 (YES in ACT 11), the processor 11 sets the timer to measure the elapsed time (ACT 12). After the timer is set, the processor 11 locks the operation of the user (ACT 13). For example, the processor 11 disenables the operation input of the user on the operation section 7b of the operation panel 7 to lock the operation.

After the operation is locked, the processor 11 displays a warning indicating to remove the external memory M on the display section 7a of the operation panel 7 (ACT 14). At this time, the processor 11 may give the warning though a sound of a buzzer and the like. After the warning is displayed, the processor 11 detects whether or not the external memory M is removed from the interface 17 before the given time elapses (before data saving condition is met) (ACT 15). If it is detected that the external memory M is removed before the given time elapses (NO in ACT 15), the processor 11 erases the display of the warning and clears the timer (ACT 17). If it is detected that the external memory M is removed, the processor 11 releases the lock state of the operation (ACT 18), and then ends the processing in a state in which the operation of a next user can be received.

Further, if the given time elapses while the external memory M is still connected with the interface 17 (in a case where data saving condition is met) (YES in ACT 15 and ACT 16), the processor 11 acquires the information of the user logged in immediately before (ACT 19). In the present embodiment, the processor 11 acquires the user ID and the authentication information (for example, a password) of the user as the information of the user logged in immediately before.

After the information of the user logged in immediately before is acquired, the processor 11 generates a hash value from the acquired information (ACT 20). For example, the processor 11 calculates the hash value from a character set of the user ID and the user password of the user logged in immediately before.

After the hash value is generated from the information of the user logged in immediately before, the processor 11 scans all the user data areas in the external memory M connected with the interface 17 (ACT 21). If data exists in the user data area of the external memory M (YES in ACT 22), the processor 11 acquires all the data of the user data area from the external memory M (ACT 23). After the data is acquired from the external memory M, the processor encrypts the acquired data using the hash value generated from the information of the user logged in immediately before (ACT 24).

After the data acquired from the external memory M is encrypted, the processor 11 stores the encrypted data in the HDD 15 serving as a data storage section (ACT 25). The processor 11 stores the encrypted data in association with the identifiable information such as the user ID and the like of the user logged in immediately before. For example, the processor 11 stores the encrypted data in association with the user ID and the user authentication information as metadata.

After the encrypted data is stored, the processor 11 erases all the data in the user data area of the external memory M (ACT 26). Herein, the processor 11 erases the management information of all the data in the user data area of the external memory M to logically erase the data from the external memory M.

After the data of the user data area in the external memory M is erased, or if it is determined that there is no data in the user data area (NO in ACT 22), the processor 11 carries out overwriting erasing processing on the external memory M (ACT 27). The overwriting erasing processing is a processing of writing any value over the data area of the external memory M to erase the data in the data area of the external memory M so that the data cannot be restored physically.

The larger the data area of the external memory is, the longer the time taken in the overwriting erasing processing is. Thus, the specific content of the overwriting erasing processing is selected according to the application form. For example, in some application form, the overwriting erasing processing may be omitted or simplified. In addition, an example of the overwriting processing will be described later.

After the overwriting erasing processing is carried out on the external memory M, the processor 11 writes the hash value (the hash value generated from the user ID and the user authentication information of the user logged in immediately before) used in the encryption in the external memory M (ACT 28). As a result, only the hash value is written in the external memory M.

After the hash value is written in the external memory M, the processor 11 stops the bus power supplied for the external memory M through the interface 17 (ACT 29). The external memory M the bus power supplied for which is stopped is stopped in a state of being attached to the interface 17. After the external memory M is stopped, the processor 11 displays a warning indicating to remove the external memory M on the display section 7a of the operation panel 7 (ACT 30). After the warning indicating to remove the external memory M is displayed, the processor 11 releases the lock state of the operation (ACT 31), and ends the processing in a state in which the operation of a next user can be received.

In accordance with the processing described above, the digital multi-function peripheral saves (holds) the data of the external memory M placed in a state of being attached to the interface 17 in the data storage section in a state in which the data is encrypted with the hash value generated from the information containing the user authentication information. Further, after the data of the data area of the external memory M is erased through the overwriting erasing processing, the digital multi-function peripheral writes the hash value used in the data encryption in the external memory M.

In this way, the data of the external memory placed in a state of being attached to the interface of the digital multi-function peripheral is protected (saved), and the security of the protected (saved) data can be guaranteed. Further, the data of the external memory can be erased so that it cannot be viewed by a third person, and the hash value generated from the user authentication information is written in the external memory so that the external memory can securely identify the data.

Next, an example of the overwriting erasing processing is described.

Figure 4:
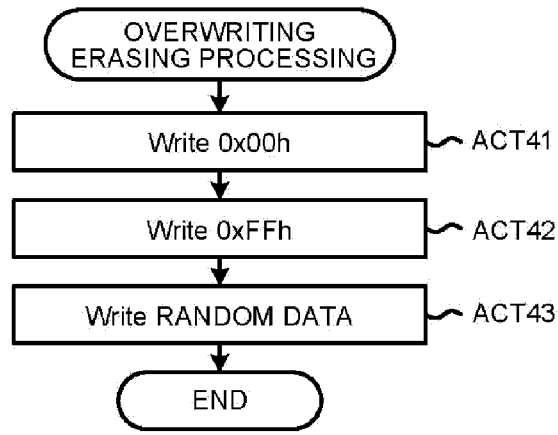
FIG. 4 is a flowchart illustrating an example of an overwriting erasing processing carried out on the external memory by the digital multi-function peripheral according to the embodiment.

FIG. 4 is a flowchart illustrating an example of the overwriting erasing processing.

In the example shown in FIG. 4, through three times of overwriting processing, the data of the memory is erased so that it cannot be physically restored from the memory. The overwriting erasing processing shown in FIG. 4 can be applied to the overwriting processing carried out on the data area of the external memory M.

That is, as the overwriting erasing processing, the processor 11 writes a value of "0x00h" over the whole user data area of the external memory M (ACT 41). After the "0x00h" is written over the whole user data area, the processor 11 writes a value of "0xFFh" over the whole user data area of the external memory M (ACT 42). After the "0xFFh" is written over the whole user data area, the processor 11 writes a random data value over the whole user data area of the external memory M (ACT 43).

Through such an overwriting erasing processing, all the memory cells of the user data area of the external memory are rewritten to "00" and then rewritten to "FF". Finally, random data is written in the user data area of the external memory, thus, the data which is originally written in the data area is hard to restore.

Next, a write-back processing of the saved data carried out by the digital multi-function peripheral 1 is described.

Figure 5:
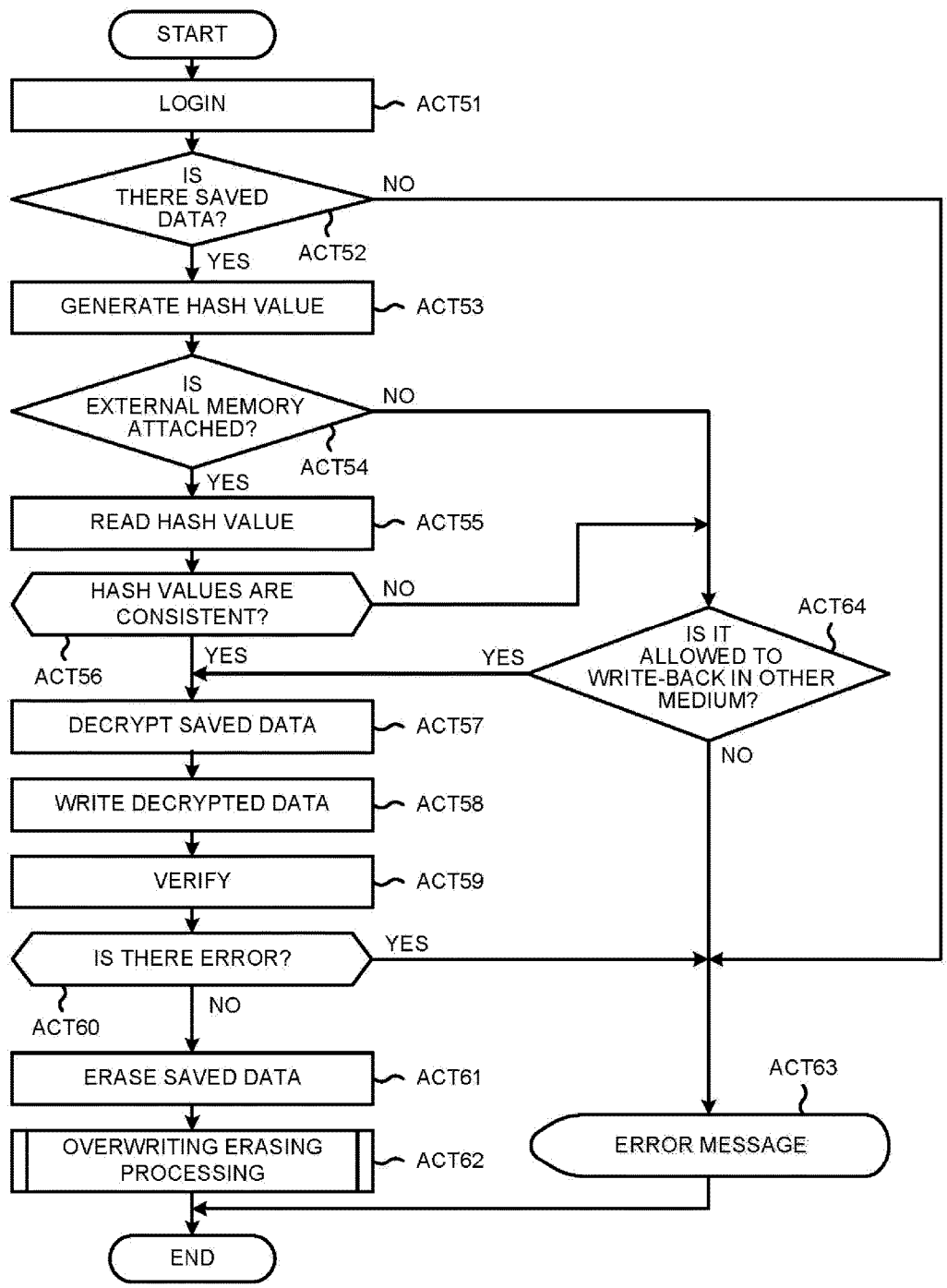
FIG. 5 is a flowchart illustrating an example of a write-back processing of saved data carried out in the digital multi-function peripheral according to the embodiment.

FIG. 5 is a flowchart illustrating an example of the write-back processing of the saved data carried out by the digital multi-function peripheral 1 according to the embodiment.

The user starting the use of the digital multi-function peripheral 1 inputs the user information to log in. For example, the user desiring to log in inputs the user ID and the authentication information (for example, a password) as the user information.

After the user information is input, the processor 11 carries out a login processing based on the input user information (ACT 51). For example, in a case where the user ID and the authentication information are acquired, the processor 11 carries out a user authentication through the user ID and the authentication information as the login processing. If the login processing succeeds (user authentication succeeds), the processor 11 determines whether or not there is saved data corresponding to the user information (ACT 52).

In addition, after the login with the user ID, if there is saved data associated with the user ID of the user logged in, the authentication information of the user may be acquired. In this way, the authentication information of the user is acquired if there is saved data, and the acquisition (input) of the authentication information of the user is omitted if there is no saved data. In this case, the saved data is stored in association with the user ID. In a case where there is saved data corresponding to the user ID, the processor 11 may carry out user authentication using the authentication information acquired from the user.

If it is determined that there is saved data of the user who is logged in successfully (YES in ACT 52), the processor 11 generates the hash value from the user ID and the authentication information of the user logged in (ACT 53). After the hash value is generated from the information (user ID and the authentication information) of the user logged in, the processor 11 confirms the attaching state of the external memory M to the interface 17 (ACT 54).

If it is confirmed that the external memory M is attached to the interface 17 (YES in ACT 54), the processor 11 reads the hash value from the external memory M attached to the interface 17 (ACT 55). After the hash value is read from the external memory M, the processor 11 determines whether or not the hash value read from the external memory M is consistent with the hash value generated from the information of the user logged in (ACT 56).

If the hash value read from the external memory M is consistent with the hash value generated from the information of the user logged in (YES in ACT 56), the processor 11 decrypts the saved data of the user based on the generated hash value (or the hash value read from the external memory M) (ACT 57).

After the saved data is decrypted using the hash value, the processor 11 writes the decrypted data in the data area of the external memory M (ACT 58). After the decrypted data is written in the external memory M, the processor 11 verifies the data written in the external memory M (ACT 59). If the verification of the data written in the external memory M is successful (NO in ACT 60), the processor 11 logically erases the saved data in the HDD 15 so that the data cannot be referred to (ACT 61). Herein, for example, the processor 11 erases the management data of the saved data so as to make the saved data inaccessible.

After the saved data is erased, the processor 11 carries out overwriting erasing processing on the memory area in which the saved data is stored (ACT 62), so that the saved data cannot be restored from the memory area of the HDD 15. In this way, the digital multi-function peripheral can return the saved data of the user logged in to the external memory M, and surely erase the saved data from the HDD 15.

Further, if the verification of the data written in the external memory M is not successful (YES in ACT 60), the processor 11 displays an error message indicating the failure in the verification on the display section 7a of the operation panel 7 (ACT 63), and then ends the processing.

Further, if the hash value read from the external memory M is not consistent with the hash value generated from the information of the user logged in (NO in ACT 56), or if no hash value is read from the external memory M, the processor 11 determines whether or not it is allowed to write-back the saved data in other storage medium (ACT 64). Herein, whether or not to allow the write-back of the saved data in a storage medium (other external memory, or a PC and the like of the user with a network connection) different from the external memory in which the saved data is stored can be set in the digital multi-function peripheral 1.

For example, it may be set in the digital multi-function peripheral that the saved data is allowed to be written-back in other external memory attached by the user, or that the saved data is allowed to be written-back in a PC of the user.

In a case where it is allowed to write-back the saved data in other external memory attached by the user to the interface 17, the hash value is stored in association with the saved data, and the processor 11 determines whether or not the hash value generated from the information of the user logged in is consistent with the hash value stored in association with the saved data. If the hash values are consistent with each other according to the determination, the processor 11 may write-back the saved data in other external memory attached by the user.

In a case where it is allowed to write-back the saved data in other recording medium (YES in ACT 64), the processor 11 proceeds to ACT 57 and executes a processing of writing the decrypted data in the recording medium in which the saved data is allowed to be written-back. Further, if it is not allowed to write-back the saved data in other recording medium according to the determination (NO in ACT 64), the processor 11 displays an error message indicating that the write-back of the saved data is not allowed on the display section 7a of the operation panel 7 (ACT 63), and then ends the processing.

As stated above, as the write-back processing of the saved data, the digital multi-function peripheral according to the present embodiment decrypts the data saved from the external memory the user forgets to remove in the digital multi-function peripheral using the hash value generated from the information of the user, and then writes-back the decrypted saved data in the external memory reattached by the user. In this way, the data in the external memory the user forgets to remove can be saved in a security protection state, and the saved data can be returned to an external memory reconnected by the user.

Further, after the saved data is returned to the external memory, the digital multi-function peripheral overwrites the memory area in which the saved data is stored with any value. In this way, it is prevented that the saved data is remained in the digital multi-function peripheral, and that the saved data is restored from the HDD of the digital multi-function peripheral.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A digital multi-function peripheral, comprising:
an operation panel configured to receive an operation input;
an interface configured to connect an external memory device;
a data storage configured to store data;
a memory configured to store a command executed by a processor; and
a processor configured to execute the command stored in the memory; wherein
the processor holds an authentication information of a user who connects the external memory device,
disables an input on the operation panel in a first case where the external memory device is attached when the user logs out,
encrypts data in the external memory device in a second case where removal of the external memory device is not detected within a given period of time after the input on the operation panel is disabled,
stores the data obtained by encrypting the data in the external memory device in the data storage,
erases the data in the external memory device, and
enables the input on the operation panel after the encrypted data is stored in the data storage,
wherein the operation panel includes a display,
the processor displays, on the display,
a warning indicating that the external memory device is to be removed in the first case where the external memory device is attached when the user logs out,
the processor generates a first hash value from information containing the authentication information of the user who connects the external memory device in a third case where a state of connection of the external memory device with the interface satisfies a data saving condition,
encrypts the data in the external memory device using the first hash value,
stores the data obtained by encrypting the data in the external memory device using the first hash value in the data storage,
generates a second hash value from the authentication information input by the user after the encrypted data is stored in the data storage, and
decrypts the encrypted data stored in the data storage based on the second hash value.

2. The digital multi-function peripheral according to claim 1, wherein
the processor overwrites the data in the external memory device with any data.

3. The digital multi-function peripheral according to claim 1, wherein
the processor generates a first hash value from information containing the authentication information of the user who connects the external memory device in a third case where a state of connection of the external memory device with the interface satisfies a data saving condition,
encrypts the data in the external memory device using the first hash value,
stores the data obtained by encrypting the data in the external memory device using the first hash value in the data storage,
writes the first hash value with which the data is encrypted in the external memory device after the data of the external memory device is erased,
generates a second hash value from the authentication information input by the user after the encrypted data is stored in the data storage, and
decrypts the encrypted data stored in the data storage based on the second hash value in a fourth case where the second hash value is consistent with the first hash value stored in the external memory device.

4. A data protection method of an external memory device, including:
holding authentication information of a user who connects the external memory device with an interface;
disabling an input on an operation panel in a first case where the external memory device is attached when a user logs out;
encrypting data in the external memory device in a second case where removal of the external memory device is not detected within a given period of time after the input on the operation panel is disabled;

storing the data stored in the external memory device in a data storage section in a state of being encrypted;

erasing the data of a data area of the external memory device; and enabling the input on the operation panel after the encrypted data is stored in the data storage section;

displaying a warning indicating that the external memory device is to be removed in the first case where the external memory device is attached when the user logs out;

generating a first hash value from information containing the authentication information of the user who connects the external memory device in a third case where a state of connection of the external memory device with the interface satisfies a data saving condition;

encrypting the data in the external memory device using the first hash value;

storing the data obtained by encrypting the data in the external memory device using the first hash value in the data storage section;

generating a second hash value from the authentication information input by the user after the encrypted data is stored in the data storage section; and decrypting the encrypted data stored in the data storage section using the second hash value.

5. The data protection method of an external memory device according to claim 4, wherein the data area of the external memory device is overwritten with any data.

6. The data protection method of an external memory device according to claim 4, further including:

generating a first hash value from information containing the authentication information of the user who connects the external memory device in a third case where a state of connection of the external memory device with the interface satisfies a data saving condition, encrypting the data in the external memory device using the first hash value, storing the data obtained by encrypting the data in the external memory device using the first hash value in the data storage section, writing the first hash value with which the data is encrypted in the external memory device after the data of the data area of the external memory device is erased;

generating a second hash value from the authentication information input by the user after the encrypted data is stored in the data storage section; and decrypting the encrypted data stored in the data storage section using the second hash value in a fourth case where the second hash value is consistent with the first hash value stored in the external memory device.

* * * * *